United States Patent
Lee et al.

(10) Patent No.: US 8,436,957 B2
(45) Date of Patent: May 7, 2013

(54) LIQUID CRYSTAL DISPLAY DEVICE HAVING GOOD HEAT RADIATING FUNCTION

(75) Inventors: Young-Bin Lee, Daegu (KR); Young-Jae Kwak, Gyeongsangnam-do (KR)

(73) Assignee: LG Display Co., Ltd., Seoul (KR)

( * ) Notice: Subject to any disclaimer, the term of this patent is extended or adjusted under 35 U.S.C. 154(b) by 329 days.

(21) Appl. No.: 12/647,090

(22) Filed: Dec. 24, 2009

(65) Prior Publication Data

US 2010/0165239 A1 Jul. 1, 2010

(30) Foreign Application Priority Data

Dec. 26, 2008 (KR) .................. 10-2008-0134996

(51) Int. Cl.
*G02F 1/1333* (2006.01)

(52) U.S. Cl.
USPC ........................................................... 349/58

(58) Field of Classification Search .................. None
See application file for complete search history.

(56) References Cited

U.S. PATENT DOCUMENTS

| 5,583,681 A | * | 12/1996 | Shioya et al. ........ | 349/60 |
| 2005/0018416 A1 | * | 1/2005 | Amaya ............ | 362/31 |

FOREIGN PATENT DOCUMENTS

| CN | 2518126 Y | 10/2002 |
| CN | 2646823 Y | 10/2004 |
| CN | 1567064 A | 1/2005 |
| CN | 1608184 A | 4/2005 |
| CN | 101101404 A | 1/2008 |

OTHER PUBLICATIONS

Chinese Office Action dated Apr. 29, 2011 with English translation.

\* cited by examiner

*Primary Examiner* — Thanh-Nhan P Nguyen

(74) *Attorney, Agent, or Firm* — Morgan, Lewis & Bockius LLP

(57) ABSTRACT

Disclosed is a liquid crystal display (LCD) device having a good heat radiating function. Surface areas of a lower cover, an upper cover, and a guide panel are increased by forming grooves at the lower cover, the upper cover, and the guide panel. Heat generated from an optical source is rapidly radiated through the lower cover, the upper cover, and the guide panel having increased surface areas. This may prevent temperature increment of a backlight unit.

13 Claims, 4 Drawing Sheets

LIQUID CRYSTAL DISPLAY DEVICE HAVING GOOD HEAT RADIATING FUNCTION

CROSS-REFERENCE TO A RELATED APPLICATION

Pursuant to 35 U.S.C. §119(a), this application claims the benefit of earlier filing date and right of priority to Korean Application No. 10-2008-0134996, filed on Dec. 26, 2008, the content of which is incorporated by reference herein in its entirety.

BACKGROUND OF THE INVENTION

1. Field of the Invention

The present invention relates to a liquid crystal display (LCD) device, and particularly, to an LCD device capable of efficiently radiating light emitted from an optical source by increasing surface areas of a lower cover, an upper cover, and a guide panel.

2. Background of the Invention

Recently, various portable electric devices, such as mobile phones, personal digital assistant (PDA), and note book computers have been developed, because of their small size, light weight, and power-efficient operations. Accordingly, flat panel display devices, such as liquid crystal displays (LCDs), plasma display panels (PDPs), field emission displays (FEDs), and vacuum fluorescent displays (VFDs), have been developed. Of these flat panel display devices, the LCDs are currently massively produced because of their simple driving scheme and superior image quality.

The LCD device is a transmissive type display device, and displays a desired image on a screen by controlling an amount of light passing through a liquid crystal layer by a refraction anisotropy of a liquid crystal molecule. Accordingly, the LCD device is provided with a backlight unit, an optical source passing through a liquid crystal layer for an image display. The backlight unit is generally divided into an edge type backlight unit that a lamp is installed on a side surface of a liquid crystal panel thus to provide light to a liquid crystal layer, and a direct type backlight unit that a lamp is installed below a liquid crystal panel thus to directly provide light to a liquid crystal layer.

According to the edge type backlight unit, a lamp is installed on a side surface of a liquid crystal panel thus to provide light to a liquid crystal layer through a reflector and a light guide plate. Accordingly, the edge type backlight unit has a thin thickness thereby to be mainly applied to a notebook, etc. However, the edge type backlight unit has a difficulty in being applied to an LCD panel having a large area since a lamp is installed on a side surface of an LCD panel. Furthermore, since light is supplied through the light guide plate, it is difficult to obtain high brightness. Accordingly, the edge type backlight unit is not suitable for an LCD panel for an LCD TV having a large area, one of the most spotlighted LCD panel.

According to the direct type backlight unit, light emitted from a lamp is directly supplied to a liquid crystal layer. Accordingly, the direct type backlight unit can be applied to a liquid crystal panel of a large area, and a high brightness can be implemented. Therefore, the direct type backlight unit is mainly used to fabricate a liquid crystal panel for an LCD TV.

As an optical source of the backlight unit, a Light Emitting Device (LED) which spontaneously emits light, rather than fluorescent lamps, is being used. The LED is an optical source which spontaneously emits monochromatic light such as R, G and B. Accordingly, when being applied to the backlight unit, the LED implements an excellent color reproduction rate, and reduces driving power.

FIG. 1 is a view showing a structure of an LCD device having a backlight unit provided with an LED in accordance with the conventional art.

As shown in FIG. 1, the LCD device comprises an LCD panel 10 composed of a first substrate 1, a second substrate 3, and an LC layer (not shown) disposed therebetween, for implementing an image as a signal is applied thereto from outside; a light emitting device (LED) 52 disposed at one lower side surface or two lower side surfaces of the LCD panel 10, for emitting light; a light guide plate 20 disposed below the LCD panel 10, for guiding light emitted from the LED 52 to the LCD panel 10; an optical sheet 30 disposed between the LCD panel 10 and the light guide plate 20, for enhancing optical efficiency by diffusing and collecting the light supplied to the LCD panel 10 under guide of the light guide plate 20; a reflector 27 disposed below the light guide plate 20, for reflecting incident light to the LCD panel 10; a guide panel 25 for supporting the light guide plate 20 and the LCD panel 10; a lower cover 40 disposed below the guide panel 25, for assembling the LCD panel 10, the light guide plate 20, the optical sheet 30, and the guide panel 25; and an upper cover 42 for supporting the LCD panel 10, the light guide plate 20, the optical sheet 30, and the guide panel 25 by being coupled to the lower cover 40.

Although not shown, a plurality of pixels are provided at the first substrate 1 of the LCD panel 10, and a pixel electrode and a thin film transistor (TFT) are provided at each of the pixels. A common electrode is formed at the second substrate 3. When a signal is applied to the LCD panel 10 from outside through the TFT, an electric field is formed at an LC layer to control alignment of LC molecules. Accordingly, transmittance of light which passes through the LC layer is controlled, thereby implementing an image. The first substrate 1 and the second substrate 3 are respectively provided with a polarizer (not shown) attached thereto. The polarizer serves to control a polarization direction of light made to be incident to the LC layer, and light emitted from the LC layer.

However, the conventional LCD device has the following problems. In the case of using the LED rather than fluorescent lamps such as Cold Cathode Fluorescent Lamps (CCFL) as an optical source, heat is generated from the LED 52. The heat is radiated through the lower cover 40. However, most of the heat is not radiated, but remains at the backlight unit. This may cause the backlight unit to have temperature increment to about 80~90. This temperature of 80~90 is higher than that of a backlight unit having CCFLs by about 40~50. This temperature increment of the backlight unit causes deformation of the optical sheet, damage of a junction of the LED, decrement of optical efficiency of the LED, degradation of liquid crystal on the panel, thereby lowering reliability of main components of the LCD device.

SUMMARY OF THE INVENTION

Therefore, an object of the present invention is to provide a liquid crystal display (LCD) device capable of efficiently radiating light emitted from an optical source by forming heat radiating members such as grooves or protrusions which increase a surface area, on a lower cover, an upper cover, and a guide panel.

To achieve these and other advantages and in accordance with the purpose of the present invention, as embodied and broadly described herein, there is provided a liquid crystal display (LCD) device, comprising: an LCD panel; a plurality of optical sources disposed at one or more sides of a lower part of the LCD panel to supply light to the LCD panel; a light guide plate disposed below the LCD panel to guide the light emitted from the optical source to the LCD panel; a guide panel for supporting the LCD panel and the light guide plate; a lower cover and an upper cover for assembling the LCD panel, the light guide plate, and the guide panel; and heat radiating members formed in at least one of the guide panel, the lower cover, and the upper cover to increase surface areas of the guide panel, the lower cover, and the upper cover to radiate heat generated from the optical source.

The heat radiating members may be implemented as a plurality of grooves formed at one or more parts of the guide panel, the lower cover and the upper cover, or a plurality of holes formed at one or more parts of the lower cover and the upper cover.

And, the heat radiating members may comprise a plurality of heat radiating fins formed at one or more parts of the lower cover and the upper cover, and comprise a plurality of convexed portions formed at one or more parts of the guide panel, the lower cover, and the upper cover.

The LCD device having a good radiating function according to the present invention may have the following advantages.

Since means for increasing a surface area, such as grooves, holes and convexed portions may be formed at the lower cover, or the upper covers, or the guide panel, light emitted from the optical sources may be efficiently radiated. This may prevent inferiority of the LCD device due to temperature increment of a backlight unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Hereinafter, a liquid crystal display (LCD) device according to the present invention will be explained in more detail with reference to the attached drawings.

Figure 1:
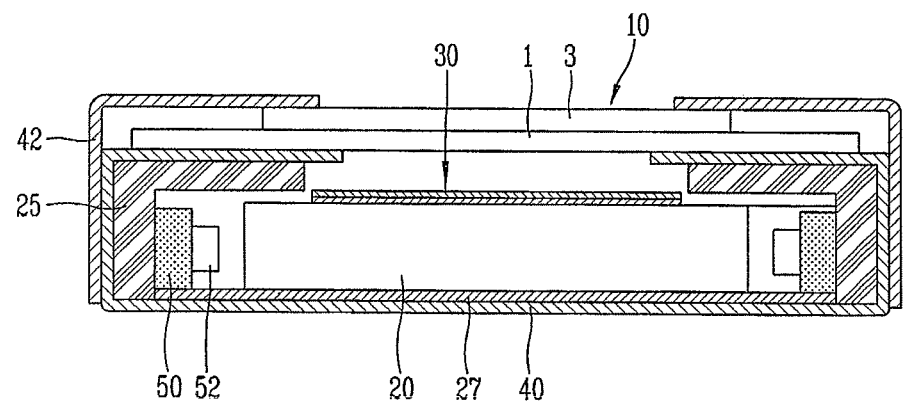
FIG. 1 is a view showing a structure of a liquid crystal display (LCD) device in accordance with the conventional art.
Figure 2:
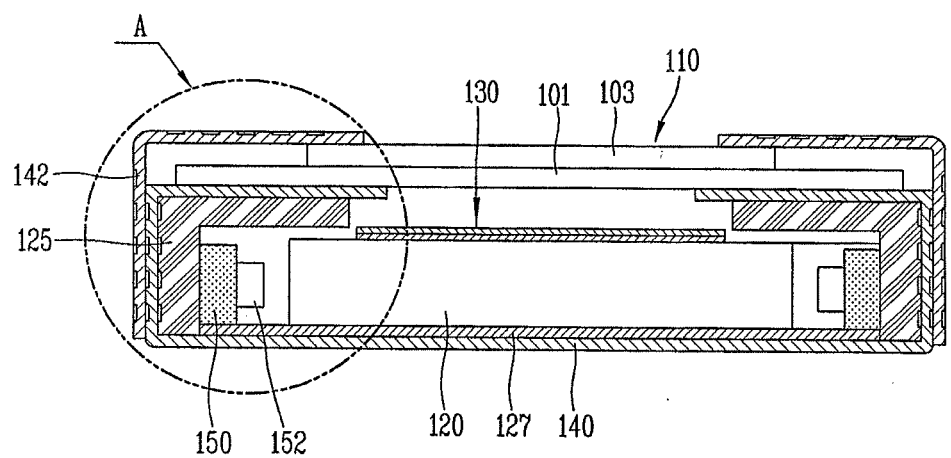
FIG. 2 is a view showing a structure of an LCD device according to a first embodiment of the present invention.

FIG. 2 is a view showing a structure of an LCD device according to a first embodiment of the present invention.

As shown in FIG. 2, the LCD device comprises an LCD panel 110, and a backlight unit disposed below the LCD panel 110 for supplying light to the LCD panel 110.

The LCD panel 110 includes a first substrate 101, a second substrate 103, and an LC layer (not shown) disposed therebetween. The first substrate 101 is a thin film transistor (TFT) array substrate, and is provided with thin film transistors and pixel electrodes formed at a plurality of pixels defined by a plurality of gate lines and data lines. On the other hand, the second substrate 103 is a color filter substrate, and includes a black matrix, a color filter layer, and a common electrode. The black matrix is an image non-display region such as a TFT forming region and a gate/data lines forming region, and serves to prevent transmittance of light. The color filter layer is composed of sub color layers such as red, green and blue (R, G and B), and substantially implements an image. And, the common electrode is formed on the color filter layer, and applies an electric field to the pixel electrodes and the LC layer as a signal is applied to the pixel electrodes of the first substrate 101.

When a signal is applied to the LCD panel 110 from outside through the TFTs, an electric field is formed at the LC layer to control alignment of LC molecules. Accordingly, transmittance of light which passes through the LC layer is controlled, thereby implementing an image. The first substrate 101 and the second substrate 103 are respectively provided with a polarizer (not shown) attached thereto. The polarizer serve to control a polarization direction of light made to be incident to the LC layer, and light emitted from the LC layer, thereby controlling optical transmittance and displaying an image.

The backlight unit includes a light emitting device (LED) 152 disposed at one lower side surface or two lower side surfaces of the LCD panel 110, for emitting light; a light guide plate 120 disposed below the LCD panel 110, for guiding light emitted from the LED 152 to the LCD panel 110; an optical sheet 130 disposed between the LCD panel 110 and the light guide plate 120, for enhancing optical efficiency by diffusing and collecting the light supplied to the LCD panel 110 under guide of the light guide plate 120; a reflector 127 disposed below the light guide plate 120, for reflecting incident light to the LCD panel 110; a guide panel 125 for supporting the light guide plate 120 and the LCD panel 110; a lower cover 140 disposed below the guide panel 125, for assembling the LCD panel 110, the light guide plate 120, the optical sheet 130, and the guide panel 125; and an upper cover 142 for supporting the LCD panel 110, the light guide plate 120, the optical sheet 130, and the guide panel 125 by being coupled to the lower cover 140.

The LED 152 is implemented as an RGB LED for emitting monochromatic light such as red, green and blue (RGB), or a white LED for emitting white light. In the case of the RGB LED, each LED for R, G and B is alternately arranged at a constant interval. Then, each monochromatic light emitted from the LEDs is mixed to each other to be implemented as white light, thereby being supplied to the LCD panel 110. On the other hand, in the case of the white LED, a plurality of LEDs are arranged at a constant interval, thereby supplying white light to the LCD panel 110.

Here, the white LED is composed of a blue LED for emitting blue light, and a fluorescent body for emitting yellow light by absorbing blue monochromatic light. Blue monochromatic light emitted from the blue LED, and yellow monochromatic light emitted from the fluorescent body are mixed to each other, thereby being supplied to the LCD panel 110 as white light.

The LED 152 is mounted on an LED board 150. The LED board 150 is implemented as an opaque printed circuit board (PCB), or a flexible circuit board (FCB). The LED 152 is mounted on the LED board 150, and signal wires are formed on an upper surface or a lower surface of the LED board 150. The signal wires are electrically connected to lead wires of the LED 152. On the LED board 150, may be mounted an inverter for applying power to the LED 152, a connector for connecting the inverter to the LED 152, and an LED controller. Here, the inverter, the connector for connecting the inverter to the LED 152, and the LED controller for controlling the LED 152 are connected to the LED 152 through the signal wires formed on the LED board 150.

The LED board 150 is attached to the guide panel 125. As shown in FIG. 2, the lower cover 140 is disposed between the guide panel 125 and the upper cover 142, so that the guide panel 125 is fixed by the lower cover 140. The LED board 150 may be attached to the lower cover 140. In this case, the guide panel 125 is arranged at the lower cover 140 and the upper cover 142. The structures of the lower cover 140, the upper cover 142 and the guide panel 125 may be variously modified according to models, sizes, etc. of the LCD device.

Light from the LED 152 installed at one side or both sides of the light guide plate 120 is made to be incident to the light guide plate 120. The light guide plate 120 is formed of polymethylmethacrylate (PMMA). When light is made to be incident onto the light guide plate 120 at an angle less than a threshold value, the light is totally reflected to be transmitted to another side of the light guide plate 120. On the contrary, when light is made to be incident onto the light guide plate 120 at an angle more than a threshold value, the light is supplied to the LCD panel 110, or is reflected by the reflector 127 to be supplied to the LCD panel 110.

The optical sheet 130 is composed of a diffusion sheet, a prism sheet, and a passivation film. The diffusion sheet serves to diffuse light emitted from the light guide plate 120, thereby having a uniform brightness. And, the diffusion sheet is fabricated by distributing spherical-shaped seeds formed of acryl resin on a base film formed of polyester (PET). That is, light emitted from the light guide plate 120 is diffused by the spherical-shaped seeds thus to have a uniform brightness.

The prism sheet is fabricated by regularly forming prisms formed of acryl-based resin on a base film formed of polyester (PET). And, the prism sheet makes light to be incident in a front direction, i.e., in a direction perpendicular to the surface of the LCD panel 110 by refracting incident light.

The prisms have triangular sectional surfaces, and are extending from one side to another side of the base film. The prism sheet is provided in two. One prism sheet is provided with prisms extending in a horizontal direction, and the other prism sheet is provided with prisms extending in a vertical direction. Accordingly, incident light has an enhanced frontal brightness.

The LCD panel 110 and the backlight unit are supported by the guide panel 125, and are assembled to each other by the lower cover 140 and the upper cover 142. Then, the LCD device is completed.

In the LCD device, the LED 152 is used as an optical source. Accordingly, the backlight unit and the LCD panel 110 have temperature increment due to heat generated from the LED 152. The heat generated from the LED 152 is radiated out through the lower cover 140 or the upper cover 142.

In order to efficiently radiate heat through the lower cover 140 and the upper cover 142, grooves 141 and 143 are formed at one side of the lower cover 140 and the upper cover 142, or at both sides of the lower cover 140 and the upper cover 142. Owing to the grooves 141 and 143, surface areas of the lower cover 140 and the upper cover 142 are increased, thereby allowing heat to be smoothly radiated.

Figure 3:
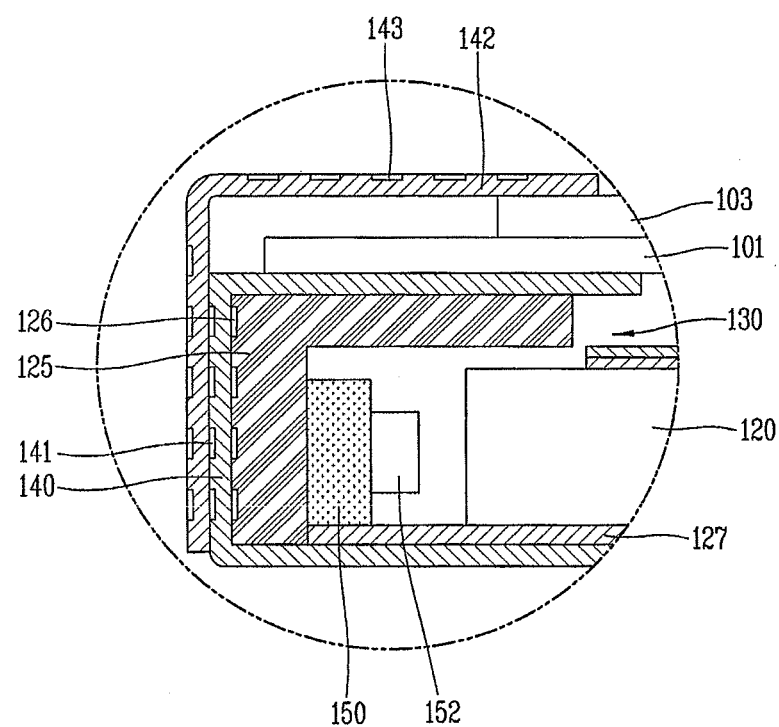
FIG. 3 is an enlarged view of a part 'A' in FIG. 2.

As shown in FIG. 3, the grooves 143 are formed not only on a side surface of the upper cover 142, but also on an upper surface of the upper cover 142. In drawing, the grooves 141 are formed on a side surface of the lower cover 140. However, the grooves 141 may be also formed on a bottom surface of the lower cover 140. Furthermore, grooves 126 may be also formed at the guide panel 125. As shown in FIG. 3, the grooves 126 are formed at the guide panel 125 contacting the lower cover 140 and the upper cover 142, thereby smoothly radiating heat through the lower cover 140 and the upper cover 142. Although not shown, the grooves may be also formed on an upper surface or a lower surface of the guide panel 125.

In the backlight unit, as the LED 152 emits light, heat is generated. And, the generated heat is transmitted to the lower cover 140 and the upper cover 142 through the LED board 150 having the LED 152 mounted thereon, and the guide panel 125. At the same time, the heat generated from the LED 152 is transmitted through a space between the LED 152 and the light guide plate 120. The heat transmitted to the lower cover 140 and the upper cover 142 through the LED board 150 and the guide panel 125 is radiated out through the lower cover 140 and the upper cover 142. Owing to the grooves 126 formed on the surface of the guide panel 125, heat is smoothly transmitted to the lower cover 140 and the upper cover 142 from the LED board 150 through the guide panel 125. And, the lower cover 140 and the upper cover 142 have increased surface areas due to the grooves 141 and 143 formed thereat, thereby allowing heat to be efficiently radiated therethrough.

Figure 4:
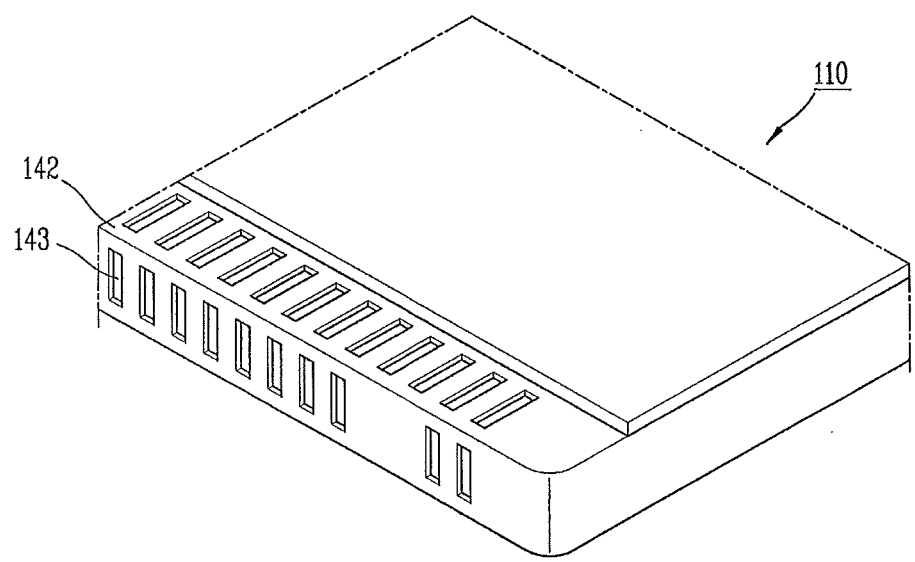
FIG. 4 is a perspective view showing a structure of an LCD device according to a first embodiment of the present invention.

FIG. 4 is a perspective view showing a structure of an LCD device according to a first embodiment of the present invention, which shows a state that the grooves 141 and 143 are formed at the lower and upper covers 140 and 142, respectively.

As shown in FIG. 4, a plurality of grooves 141 and 143 are formed on side and upper surfaces of the lower and upper covers 140 and 142 where the LED 152 is arranged. Here, the grooves 141 and 143 may be formed in an approximate quadrangular shape having a predetermined area, and may be long extending from one side to another side of the LCD device with a constant width. The grooves 141 and 143 may be formed in various shapes. As the grooves 141 and 143 are formed at the lower cover 140 and the upper cover 142, surface areas of the lower cover 140 and the upper cover 142 are increased. As a result, heat can be smoothly radiated out through the lower cover 140 and the upper cover 142. Accordingly, any type of grooves may be implemented only if heat can be efficiently radiated out as the surface areas of the lower cover 140 and the upper cover 142 are increased.

In drawing, the grooves 126, 141 and 143 are formed in an aligned manner. However, the grooves 126, 141 and 143 need not be aligned. The grooves 126, 141 and 143 serve to increase the surface areas of the guide panel 125, the lower cover 140 and the upper cover 142, respectively. Accordingly, the grooves 126, 141 and 143 may have any arrangements only if the surface areas of the guide panel 125, the lower cover 140, and the upper cover 142 can be increased. That is, the grooves 126, 141 and 143 may be aligned to one another, or may not be aligned to one another. Alternatively, the grooves 126, 141 and 143 may be formed in a specific pattern, or may be irregularly formed.

Figure 5:
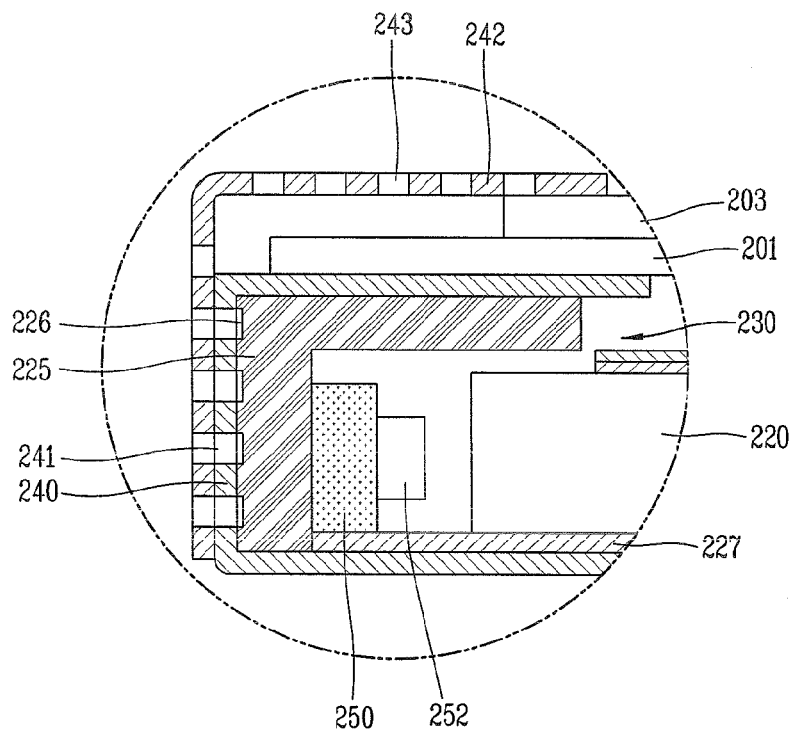
FIG. 5 is a partially enlarged view showing a structure of an LCD device according to a second embodiment of the present invention.

FIG. 5 is a partially enlarged view showing a structure of an LCD device according to a second embodiment of the present invention.

The LCD device according to the second embodiment is same as the LCD device according to the first embodiment except for types of the grooves. Accordingly, only the different structure of the LCD device according to the second embodiment will be explained.

As shown in FIG. 5, a plurality of grooves 226 are formed on a side surface of a guide panel 225 contacting a lower cover 240 and an upper cover 242. And, a plurality of holes 241 and 243 are formed at the lower cover 240 and the upper cover 242. The holes 241 and 243 correspond to the grooves of the first embodiment, and serve to enhance a heat radiating function through the lower cover 240 and the upper cover 242.

More concretely, heat is transmitted to the lower cover 240 and the upper cover 242 through the guide panel 225. As a part of the guide panel 225 is directly exposed out of the LCD device by forming the plurality of holes 241 and 243 at the lower cover 240 and the upper cover 242, heat transmitted to the lower cover 240 and the upper cover 242 through the guide panel 225 can be more effectively radiated out.

The shapes or sizes of the holes 241 and 243 not limited to specific ones. Although not shown, a plurality of grooves as well as the holes 241 and 243 may be formed on the lower cover 240 and the upper cover 242.

Figure 6:
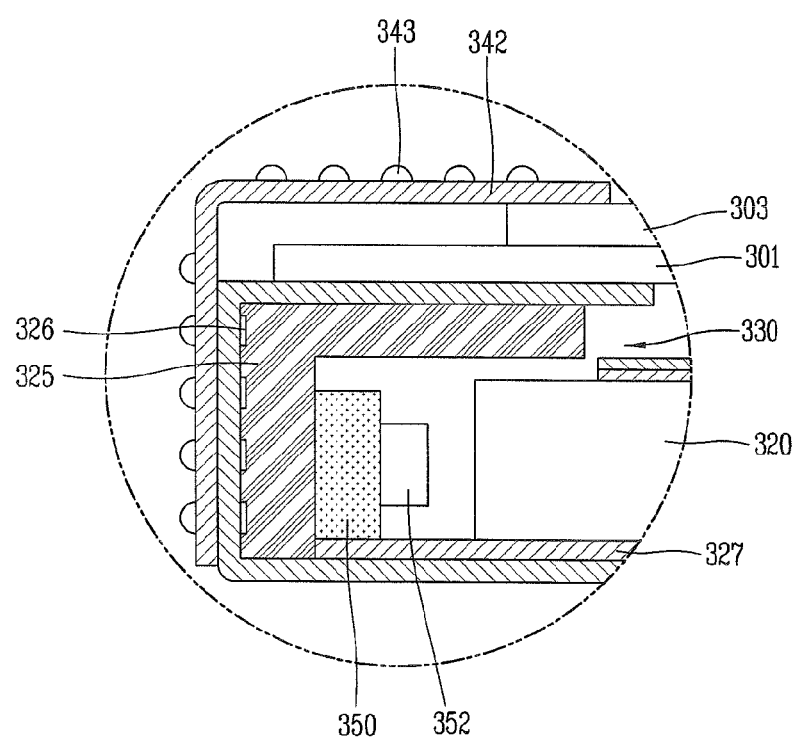
FIG. 6 is a partially enlarged view showing a structure of an LCD device according to a third embodiment of the present invention.

FIG. 6 is a partially enlarged view showing a structure of an LCD device according to a third embodiment of the present invention.

As shown in FIG. 6, a plurality of grooves 326 are formed on side surfaces of a lower cover 340 and a guide panel 325. And, a plurality of convexed portions 343 are formed at an upper cover 342. Since the upper cover 342 has an increased surface area due to the convexed portions 343, heat can be efficiently radiated out through the lower cover 340 and the upper cover 342.

The shape of the convexed portions 343 is not limited to a specific one. The convexed portions 343 serve to enhance efficiency of heat radiation by increasing the surface area of the upper cover 342. Accordingly, the convexed portions 343 may be configured to have any shapes only if the efficiency of heat radiation can be enhanced by increasing the surface area of the upper cover 342. For instance, the convexed portions 343 may be formed to have a circular shape, or an oval shape, or a polygonal shape. Alternatively, the convexed portions 343 may be long formed along a side surface of the upper cover 342 with a constant width. Still alternatively, the convexed portions 343 may be formed at the lower cover 340. More concretely, the convexed portions 343 may be formed at a bottom surface or a side surface of the lower cover 340 not contacting the upper cover 342. This may increase the surface area of the lower cover 340 thus to enhance heat radiation. Although not shown, the convexed portions 343 rather than the grooves 326 may be formed at the guide panel 325.

Figure 7:
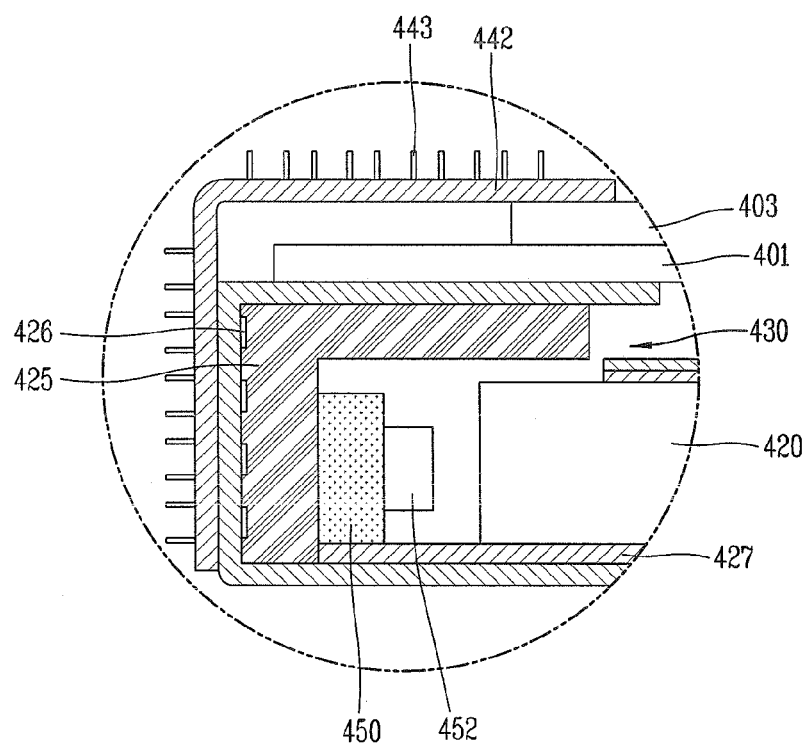
FIG. 7 is a partially enlarged view showing a structure of an LCD device according to a fourth embodiment of the present invention.

FIG. 7 is a partially enlarged view showing a structure of an LCD device according to a fourth embodiment of the present invention.

As shown in FIG. 7, a plurality of grooves 426 and 441 are formed on side surfaces of a lower cover 440 and a guide panel 425. And, a plurality of heat radiating fins 443 are formed at an upper cover 442. The heat radiating fins 443 serve to allow heat to be efficiently radiated out through the upper cover 442 by increasing a surface area of the upper cover 442. Here, the size and shape of the heat radiating fins 443, or the number of the heat radiating fins 443 may be differently designed according to the size of the LCD device, or temperature of heat generated from an LED 452.

The heat radiating fins may be formed at the lower cover 440. More concretely, the heat radiating fins may be formed at a bottom surface or a side surface of the lower cover 440 not contacting the upper cover 442. This may increase the surface area of the lower cover 440 thus to enhance heat radiation.

As aforementioned, in the present invention, the grooves, etc. for enhancing a heat radiating function are formed at the lower cover, the upper cover, and the guide panel, thereby efficiently radiating heat generated from the LED to the outside. This may prevent temperature increment of the backlight unit due to the LED, thereby preventing deformation of the optical sheet, decrement of optical efficiency of the LED, or degradation of liquid crystal.

In the aforementioned drawings and detailed descriptions, the grooves are formed at all the parts of the lower cover, the upper cover, and the guide panel. However, the grooves may be also formed at a part or some parts of the lower cover, the upper cover, and the guide panel. It is also possible that the grooves are formed at the guide panel, the holes are formed at the lower cover, and the heat radiating fins or the convexed portions are formed at the upper cover. That is, among the heat radiating members such as the grooves, the holes, the convexed portions, and the heat radiating fins disclosed in the first to fourth embodiments of the present invention for efficiently radiating heat generated from the LED, the same type of components or different types of components may be formed at the lower cover, the upper cover, and the guide panel, respectively.

Furthermore, in the aforementioned descriptions, the LED was used as the optical source. However, a backlight unit having fluorescent lamps or other elements as the optical source may be also applied to the present invention.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
an LCD panel;
a plurality of optical sources disposed at one or more sides of a lower part of the LCD panel to supply light to the LCD panel;
a light guide plate disposed below the LCD panel to guide the light emitted from the optical source to the LCD panel;
a guide panel for supporting the LCD panel, the optical source, and a circuit configured to control the optical source, the circuit directly contacting the guide panel;
a lower cover and an upper cover for assembling the LCD panel, the light guide plate, and the guide panel; and a plurality of heat radiating members formed in the guide panel, the lower cover, and the upper cover to increase surface areas of the guide panel, the lower cover, and the upper cover to radiate heat generated from the optical source.

2. The LCD device of claim 1, wherein the optical sources includes Light Emitting Devices (LEDs).

3. The LCD device of claim 1, wherein the heat radiating members comprise a plurality of grooves formed in the guide panel, the lower cover, and the upper cover.

4. The LCD device of claim 1, wherein the heat radiating members comprise a plurality of holes formed in the lower cover and the upper cover.

5. The LCD device of claim 1, wherein the heat radiating members comprise a plurality of heat radiating fins formed in the lower cover and the upper cover.

6. The LCD device of claim 1, wherein the heat radiating members comprise a plurality of convexed portions formed in at least one of the guide panel, the lower cover and the upper cover.

7. A liquid crystal display (LCD) device, comprising:
an LCD panel;
a plurality of optical sources disposed in at least one side surfaces of a lower part of the LCD panel to supply light to the LCD panel;
a light guide plate disposed below the LCD panel to guide the light emitted from the optical source to the LCD panel;
a guide panel for supporting the LCD, the optical source, and a circuit configured to control the optical source, the circuit directly contacting the guide panel;
a lower cover and an upper cover for assembling the LCD panel, the light guide plate, and the guide panel; and
a plurality of grooves formed at the guide panel, the lower cover, and the upper cover to increase surface areas of the guide panel, the lower cover, and the upper cover to radiate heat generated from the optical source.

8. A liquid crystal display (LCD) device, comprising:
an LCD panel;
a plurality of optical sources disposed in at least one side surfaces of a lower part of the LCD panel to supply light to the LCD panel;
a light guide plate disposed below the LCD panel to guide the light emitted from the optical source to the LCD panel;
a guide panel for supporting the LCD panel, the optical source, and a circuit configured to control the optical source, the circuit directly contacting the guide panel;
a lower cover and an upper cover for assembling the LCD panel, the light guide plate, and the guide panel; and
a plurality of first heat radiating members formed in at least one of the guide panel and the upper cover.

9. The LCD device of claim 8, further comprising a plurality of second heat radiation members formed in the lower cover.

10. The LCD device of claim 9, wherein the first and second heat radiation members include respectively a plurality of grooves.

11. The LCD device of claim 9, wherein the first and second heat radiation members include respectively a plurality of heat radiating holes.

12. The LCD device of claim 11, wherein the heat radiating holes in the lower cover corresponds to the heat radiating holes in the upper cover.

13. The LCD device of claim 11, wherein the heat radiating holes in the lower cover and the upper cover corresponds to the grooves in the guide panel.

* * * * *